United States Patent
Meyers et al.

(10) Patent No.: US 11,290,181 B1
(45) Date of Patent: Mar. 29, 2022

(54) SYSTEM AND METHOD FOR MEASUREMENT OF ENTANGLED PHOTONS WAVEFUNCTIONS

(71) Applicant: U.S. Army Combat Capabilities Development Command, Army Research Labortary, Adelphi, MD (US)

(72) Inventors: Ronald E. Meyers, Columbia, MD (US); Keith S. Deacon, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 17/205,117

(22) Filed: Mar. 18, 2021

(51) Int. Cl.
*H04B 10/079* (2013.01)
*H04B 10/70* (2013.01)

(52) U.S. Cl.
CPC .......... *H04B 10/079* (2013.01); *H04B 10/70* (2013.01)

(58) Field of Classification Search
CPC .............................. H04B 10/079; H04B 10/70
USPC ...................................................... 398/25–33
See application file for complete search history.

(56) References Cited

U.S. PATENT DOCUMENTS

| | | | | |
|---|---|---|---|---|
| 7,536,012 B1* | 5/2009 | Meyers | ................. | H04L 9/0858 380/44 |
| 10,992,391 B1* | 4/2021 | Meyers | .............. | H04B 10/0799 |
| 2002/0140941 A1* | 10/2002 | Pedigo | ................... | B82Y 10/00 356/450 |
| 2007/0064945 A1* | 3/2007 | Yuan | ...................... | H04B 10/70 380/263 |
| 2008/0260393 A1* | 10/2008 | Youn | ..................... | H04L 9/0858 398/152 |
| 2010/0079833 A1* | 4/2010 | Langford | ............... | B82Y 10/00 359/107 |
| 2011/0150226 A1* | 6/2011 | Cho | ...................... | H04L 9/0858 380/278 |
| 2013/0308956 A1* | 11/2013 | Meyers | ................. | H04B 10/70 398/130 |
| 2015/0055961 A1* | 2/2015 | Meyers | ................. | H04B 10/70 398/140 |

(Continued)

OTHER PUBLICATIONS

Chen et al; Use of polarization freedom beyond polarization division multiplexing to support high-speed and spectral efficient data transmission; Aug. 2016; Light: Science and Applications; pp. 1-7. (Year: 2016).*

(Continued)

*Primary Examiner* — Amritbir K Sandhu
(74) *Attorney, Agent, or Firm* — Emily C. Moscati

(57) ABSTRACT

Measurement of entangled photon quantum wavefunction properties is vital for studying the fundamentals of entanglement and for future applications in quantum communications, quantum metrology, quantum sensing and imaging. Despite its importance, measuring the wavefunction is difficult, particularly in pulsed and other systems with system features and wavefunctions changing in space and time. This invention uses ghost imaging techniques to directly measure the entangled photon wavefunction of pulsed origin temporal and polarization entangled photons. The invention may be used to improve wavefunction quality after propagation through turbulent or scattering media.

23 Claims, 10 Drawing Sheets

(56) References Cited

U.S. PATENT DOCUMENTS

| | | | | |
|---|---|---|---|---|
| 2015/0372768 | A1* | 12/2015 | Dynes | H04B 10/70 |
| | | | | 398/188 |
| 2016/0047643 | A1* | 2/2016 | Yuan | H01S 5/4006 |
| | | | | 398/25 |
| 2018/0032896 | A1* | 2/2018 | Fleischer | G06F 17/17 |
| 2018/0062755 | A1* | 3/2018 | Simard | G02F 1/0121 |
| 2018/0062838 | A1* | 3/2018 | Godfrey | H04B 10/70 |
| 2018/0241480 | A1* | 8/2018 | Hughes | G06N 10/00 |
| 2019/0013878 | A1* | 1/2019 | Paraiso | G02F 1/225 |
| 2019/0137425 | A1* | 5/2019 | Gupta | G01N 27/028 |
| 2019/0260478 | A1* | 8/2019 | Lucamarini | H04B 10/548 |
| 2020/0065069 | A1* | 2/2020 | Tyagi | H04L 9/0852 |
| 2020/0274701 | A1* | 8/2020 | Yuan | H04L 9/0662 |
| 2021/0132969 | A1* | 5/2021 | Smith | G06F 9/30 |

OTHER PUBLICATIONS

Lundeen et al; Direct measurement of the quantum wave function; Jun. 2011; Institute for National Measurement Standards, National Research Council; pp. 1-4. (Year: 2011).*

Chen et al; Use of polarization freedom beyond polarization division multiplexing to support high speed and spectral efficient data transmission; Aug. 2016; Official Journal of the CIOMP; pp. 1-7. (Year: 2016).*

\* cited by examiner

Gaussian solid line sigma=65

Gaussian solid line sigma=60

SYSTEM AND METHOD FOR MEASUREMENT OF ENTANGLED PHOTONS WAVEFUNCTIONS

GOVERNMENT INTEREST

The embodiments described herein may be manufactured, used, and/or licensed by or for the United States Government without the payment of royalties thereon.

BACKGROUND

Field of the Invention

This invention relates in general to measuring the properties of quantum systems, more specifically the biphoton wavefunction of entangled photon pairs.

Description of the Related Art

The entangled photon system (biphoton) is at the core of quantum physics. Simultaneously exhibiting the essence of entanglement, superposition and nonlocality makes it a key to future quantum technologies such as quantum communications, quantum metrology, and quantum sensing and imaging. Unfortunately, the wavefunction has been difficult to measure especially in pulsed systems where the pulses change shape in time and space. To overcome the difficulties of measuring and comparing the wavefunction of temporal and polarization entangled photons we explore using the ghost imaging paradigm for measuring and characterizing biphoton wavefunctions. While ghost imaging provides a new valuable paradigm for imaging and measuring physical objects, we find that it also subsumes different approaches to measure wavefunctions and provides a means to help compare the results of competing and disparate wavefunction measurement formulations.

Entangled photon pairs (biphotons) are a valuable resource for studying fundamental physics, see A. Einstein et al., "*Can Quantum Mechanical Description of Physical Reality be Considered Complete?*", Physical Review 47, 777 (1935); Y. Shih, "*Entangled Biphoton source property and preparation*," Report Progress Physics, 66, p 1009-1044 (2003); and for developing quantum technology see T. B. Pittman, et al., "Optical imaging by means of two-photon quantum entanglement", Physical Review A 52, R3429 (1995); R. Meyers et al. "*Ghost-imaging experiment by measuring reflected photons*," Physical Review A 77041801 (R) (2008); and R. Meyers et al. "*Turbulence-free ghost imaging*," Applied Physics Letters 98, 111115 (2011). Entanglement means that the two photon system cannot be described by describing each of the photons independently. The information in an entangled photon system can be considered as the mutual information of the photon system.

The wavefunction is instrumental in describing the physics and the information content of a quantum system. The biphoton behavior can be represented by a superposition of wavefunctions each with amplitude related to the square root of the probability of a single photon and a phase as described in Y. Shih, "*Entangled Biphoton source-property and preparation*," Report Progress Physics, 66, p 1009-1044 (2003). The properties of entangled photons are described by the biphoton wavefunction. The temporal wavefunction is difficult to measure, but when it is measured it provides the information on the probability of occurrence of the biphoton state and phase as a function of time of separation of the two single photon detection measurements. It is important to note that the wavefunction can accurately describe more complicated quantum systems as can superpositions of wavefunctions.

There are different ways to measure a wavefunction. Notably, these include but are not limited to weak measurements, as described in Y. Aharonov et al. "*How the results of a component of spin of a spin-½ particle can turn out to be* 100," Physical Review Letters 60, 1351 (1998), strong measurements as described in G. Vallone and D. Dequal, "*Strong Measurements Give a Better Direct Measurement of the Quantum Wave Function*," Physical Review Letters 116, 040502 (2016); and direct measurements as described in C. Zhang et al., "*Direct Measurement of the Two-dimensional Spatial Quantum Wavefunction via Strong Measurements*," Physical Review A 101012119 (2020); S Zhang et al, "$\delta$-*Quench Measurement of a Pure Quantum-State Wave Function*, "Physical Review Letters 123190402 (2019), and J. Lundeen et al., "*Direct measurement of the quantum wavefunction*", Nature 474188-191 (2011). It is difficult to determine the advantage of one approach or formulation over another.

It would be beneficial for both the advancement of quantum fundamentals and quantum technology if a quantum based framework was developed to compare the results of competing and disparate approaches or formulations. Single photon wavefunction direct measurement techniques have been developed by Lundeen (J. Lundeen et al., "*Direct measurement of the quantum Wavefunction*," Nature 474188-191 (2011)) and Du ($\delta$-Quench) (S Zhang et al, "$\delta$-*Quench Measurement of a Pure Quantum-State Wave Function*," Physical Review Letters 123190402 (2019)). The biphoton temporal wavefunction for polarization entangled photons was measured by Beduini (see F. Beduini et al. "*Interferometric measurement of the biphoton wave function*," Physical Review Letters 113183602 (2014)) for a continuous spontaneous parametric down-conversion (SPDC) source. Du measured the biphoton for a four wave mixing source in a continuous modulated source of a Rubidium-Electro-Magnetically Induced Transparency (EIT) setup P. Chen, S. Du et al., "*Measuring the Biphoton temporal wave Function with Polarization Dependent Time Resolved Two-Photon Interference*," Physical Review Letters 114010401 (2015).

SUMMARY OF THE INVENTION

This invention is used to measure the wavefunction of entangled photon pairs (biphotons) that may be either temporally-spatially (time-space) entangled or polarization entangled, or both temporally-spatially (time-space) and polarization entangled. The wavefunction describes both the physics properties and the information carrying potential of the biphotons. Therefore knowledge of the wavefunction is extremely beneficial to development of quantum technology such as quantum communications, quantum metrology, quantum sensing and imaging. An advantage of this invention is its use to be able to experimentally compare relative advantages of different approaches to measuring the biphoton and to determine the wavefunction quantitative and qualitative properties. Unlike methods that use continuous systems, we implement our biphoton wavefunction experiments in a pulsed source system that has narrow band properties useful for quantum communications, quantum metrology, and quantum metrology, and for isolating the fundamentals of biphoton generation within a pulse. The invention is also useful optimizing communications through scattering media and turbulence.

The present invention is directed to a preferred embodiment entangled photon wavefunction measurement system comprising at least one entangled photon source configured to output first and second entangled photons that are inputted to the first and second measurement components respectively. The first measurement component comprises a modulator to modulate the phase of an inputted photon. The modulated inputted photon is then directed to an optionally gated photon detector to be detected. Each event of a sequence detection events comprises a "1" if a photon was detected and "0" if a photon was not detected that are sent to a computer/processor. The second measurement component comprises an at least three way path splitter configured to direct inputted single photons with equal probability to the three output paths. Each of the output paths are directed to a modulator where the chosen basis for the coincidence measurement is applied to each path, e.g. 0 phase, 90 phase, and 270 phase for an orthogonal basis coincidence measurement or 0 phase, 120 phase, and 240 phase for a symmetric basis coincidence measurement.

After modulation, the photons are directed to optionally gated photon detectors. The sequence of detection events from each of the second measurement component detectors comprise a "1" if a photon was detected and "0" if a photon was not detected that are sent to a computer/processor along with which detector reported the detection event. The computer/processor determines the number of coincident measurements between the first and second measurement components for each modulator setting for some time interval dT. These coincidence measurements and related single photon detection events are used to compute a $G^{(2)}$ for each measurement basis. The wavefunction amplitude and phase are determined using the calculated $G^{(2)}$ measurements and the specified bases e.g. Equations 9-13 from the Wavefunction Measurement Using Orthogonal Polarization Bases section for the choice of orthogonal bases or equations 19 from the Wavefunction Measurement Using Symmetric Polarization Bases section and equation 10 from the Finding γ subsection for the choice of symmetric bases. The phase of the wavefunction is recovered by ATAN[IMAG{ψ}/REAL{ψ}] where ATAN is the arc-tangent function, IMAG reports only the imaginary part of the input argument and REAL returns only the real part of an input argument.

Entangled Photon Sources:

Exemplary examples of entangled photon sources include entangled photons generated via SPDC in a nonlinear crystal such a Beta-Barium Borate (BBO) or Potassium Titanyl Phosphate (KTP), entangled photons generated in a quasi-phase matched nonlinear media such as periodically poled KTP (PPKTP) or periodically poled Lithium Niobate (PPLN), and entangled photons generated in a four-wave mixing (FWM) process in a nonlinear optical fiber or polarization maintaining birefringent optical fiber.

Entangled photons generated with SPDC or FWM processes typically generate entangled photon pairs, each pair comprised of two photons with one photon at wavelength, $\lambda_s$ and one photon at $\lambda_i$, these wavelengths are traditionally called signal and idler wavelengths. When $\lambda_s$ and $\lambda_i$ have the same wavelength this process is called degenerate; when they are different it is called non-degenerate. The signal wavelength is typically a higher energy and the idler wavelength is typically a lower energy. The pump photons for the nonlinear process of entangled photon generation may be provided by, but are not limited to, pulsed or continuous laser sources. It must be recognized that any photon possesses a number of degree of freedom including but not limited to polarization, frequency, photon-number, phase, wavelength, orbital angular momentum, and linear momentum. Entanglement can exist between polarizations, e.g. horizontal and vertical, frequencies, or between any of the degrees of freedom of a photon or multiple photons. It is to be appreciated that a stimulated FWM process may be employed to generate correlated photons, whereas the more typical FWM methods rely upon a spontaneous process for the generation of photon pairs. Note that entanglement refers to the superposition of at least two components of a composite quantum state, such as the polarization of two photons, where the state of the system cannot be factored as a direct product of the components. Measurement of the entangled photon pairs is an interference between conjugate degrees of freedom of a quantum particle pair (photon pair) and may exhibit constructive interference yielding a maxima of coincident detections or destructive interference yielding a minima of coincidence detections.

Entangled photons also have the property of temporal entanglement, which means that the entangled pairs are entangled over a length of time interval between detector measurements that comprise a coincident detection.

Measurement Synchronization:

In order for a receiver to make accurate measurement of the information being transmitted by a sender with modulated entangled photons, the receiver must synchronize the timing of their measurements with the times that the sender is transmitting entangled photons. One means to establish synchronized measurement of a pulsed source that operates at a known repetition rate involves scanning each detector over a range of delays spanning the time between two pulses. Each detector will measure a maximum of single photon counts when temporally synchronized with the rate the photons are being produced by the sender. When the single photons counts are synchronized, then coincidence measurements between each pair of selected detectors are made with offsets for the coincidences being determined by +/−integer multiple offsets of the time between pulses. A peak of coincidence measurements will be found when, for example, detector A is at time $T(A_i)$ and detector B is at time $T(B_i)$ where i indicates the $i^{th}$ measurement in a sequence of single photon measurements. Further fine tuning of coincidences can be made by very slightly shifting $T_A$ or $T_B$ small amounts, within the duration of a pulse, to find a maxima of coincidences.

In the case of continuous source of entangled photons, the measurements of the photon detections are shifted in time to find a maximum of coincidence detections. This may be accomplished, for example, by time-tagging all measured photons from all the detectors and the peak correlation can be found by post processing the time-tagged measurements to find the time-tag offsets for coincidence maxima. It should be noted, that the relative time difference between the measured detection events for a coincidence measurement can be due to unequal propagation path distances, non-identical generation times of the entangled photons, and electronic processing buffering and lags when measured. All of these effects are mitigated when applying the synchronization methods described above.

Glauber Second Order Correlation:

The Glauber second order correlation $G^{(2)}$ can be determined by taking the ratio of the probability to measure a coincidence between detector a and detector b over some time interval dT represented by $<CC_{ab}>$ and dividing by the product of the probability of measuring a single photon on detector a or detector b, represented as $<D_a>$ and $<D_b>$ respectively. $G^{(2)}$ can then be computed as $<CC_{ab}>/[<D_a>*<D_b>]$. Note that < > indicates an average over the ensemble of measurements. $G^{(2)}$ is typically a more stable measure than the raw measurement of the counting rates of coincidences and single photons.

BRIEF DESCRIPTION OF THE DRAWINGS

The embodiments herein will be better understood from the following detailed description with reference to the drawings, in which.

DETAILED DESCRIPTION

Figure 1:
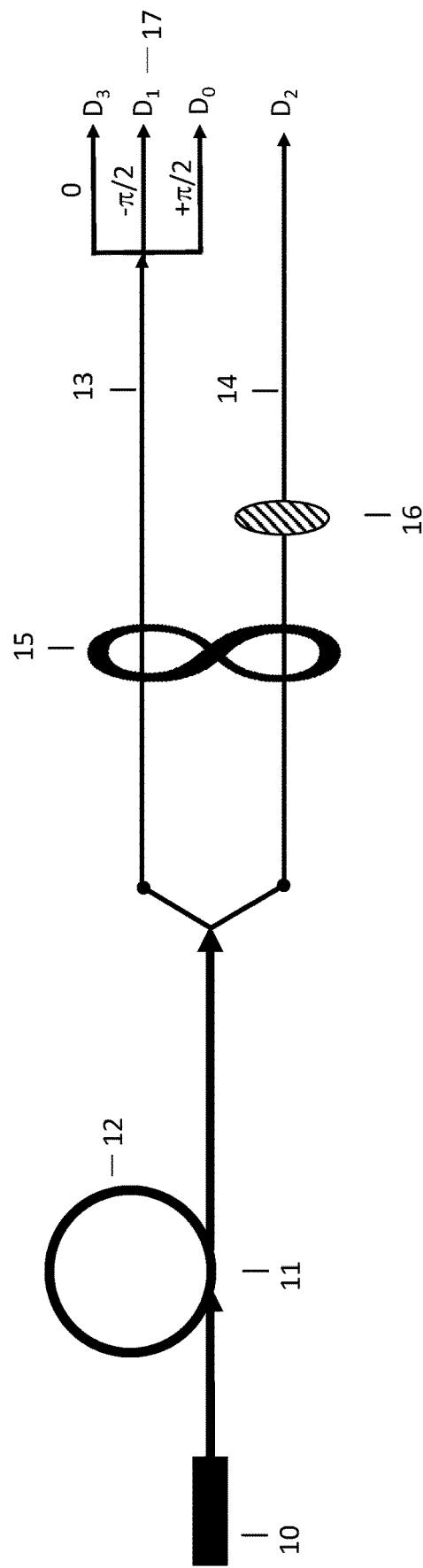
FIG. 1 is a depiction of an exemplary embodiment of the biphoton wavefunction measurement system.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skilled in the art to practice the embodiments of the invention. Various changes may be made without departing from the spirit and scope of this description and the claims. Accordingly, the examples should not be construed as limiting the scope of the embodiments of the invention. The claims define the invention.

Relative sizes of components are for illustrative purposes only and do not reflect the actual sizes that may occur in any actual embodiment of the invention. Like numbers in two or more figures represent the same or similar elements. Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second entangled photon regions, these terms are only used to distinguish one entangled photon source, region, element, component, layer or section from another source, region, element, component, layer or section. Thus, a first source, region, element, component, layer or section discussed below could be termed a second source, region, element, component, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

I. Ghost Imaging the Biphoton Wavefunction: Methods

In this section we describe two methods to directly measure the biphoton wavefunction using our invention. Because of the similarity to Ghost Imaging with entangled photons we refer to both methods as versions of ghost imaging wavefunctions. First in our setup shown in FIG. 1 we have a test arm (signal) and a reference arm (idler). The test arm modulates the biphoton phase. The reference arm resolves the coincidence measurements as a function of polarization measurements by splitting into three post selection polarization analyzers, analogous to three coincident pixels of a polarization measuring camera.

Also both methods calculate R. Glauber, "*Coherent and Incoherent States of the Radiation Field*," Physical Review 131 266 (1963) $G^{(2)}$ functions as is common for ghost imaging. The symmetric method uses polarization measurement bases similar to that used by Beduini (see F. Beduini et al. "*Interferometric measurement of the biphoton wave function*," Physical Review Letters 113 183602 (2014)) for weak measurements in a continuous SPDC system but uses direct measurements instead in a four-wave mixing (FWM) pulsed system. Fiber systems including pulsed ones can be addressed using space time duality considerations and analysis as described in M. Tsang and D. Psaltis, "*Propagation of temporal entanglement*", Physical Review A 73, 013822 (2006), B. Saleh et al., "*Duality between partial coherence and partial entanglement*," Physical Review A. (2000), and K. Fischer et al. "*Dynamical modeling of pulsed two photon interference*," New Journal of Physics (2016).

The pulsed source of entangled photons generate polarization entangled photons that also exhibit temporal entanglement. A Feynman diagram shows the temporal indistinguishability of two alternate and indistinguishable ways of measuring a joint photon coincidence detection of entangled photons. S. Du, E. Oh, J. Wen and M. Rubin, et al. "*Four-wave mixing in three-level systems: Interference and entanglement*," Physical Review A 76, 013803 (2007) worked out the Feynman Diagram for temporal indistinguishability for a Rubidium four wave mixing system. The Feynman diagram in FIG. 5 was modified and adapted to our pulsed nonlinear Sagnac fiber system that generates polarization and temporal entangled photons.

II. Wavefunction Measurement Using Orthogonal Polarization Bases

The delta quench ($\delta$-quench) method (S Zhang et al, "$\delta$-*Quench Measurement of a Pure Quantum-State Wave Function*," Physical Review Letters 123 190402 (2019)) was developed to find the single quantum particle time dependent wavefunction from a series of measurements. In our research we extend the delta quench method to find the two photon temporal wavefunction of polarization entangled photons generated from four wave mixing. Although the original delta quench method does not use Glauber second order coherences, we measure the Glauber second order coherence (R. Glauber, "*Coherent and Incoherent States of the Radiation Field*," Physical Review 131 266 (1963)) in a series of three measurement bases, $0$, $\pi/2$, $-\pi/2$ and develop the wavefunctions for a pulsed system in terms of them. The $G^{(2)}$ terms account for the variation in the single photon counts.

Our setup in FIG. 1 allows simultaneous detector coincidence measurement of all three bases across the appropriate photon waveguide modes. Alternately in a two mode signal and idler setup, operators of the method equivalently shift the phase of the wavefunction from 0 by $\pi/2$ and, $-\pi/2$ such that the phase and amplitude can be extracted from the measurements and the equations:

$$Pr_n(\theta) = |\langle b_0|\psi\rangle + (e^{i\theta} - 1)\langle b_0|a_n\rangle \psi_n|^2 \quad (1)$$

$$Pr_n(\theta) = |\langle b_0|\psi\rangle|^2 \left|1 + \frac{(e^{i\theta} - 1)\langle b_0|a_n\rangle}{\langle b_0|\psi\rangle}\psi_n\right|^2 \quad (2)$$

$$P_0 \to Pr_n(0) = \langle b_0|\psi\rangle^2 \quad (3)$$

With proper scaling, the probabilities can be equated to the $G^{(2)}$ measurements.

$$p_1 \to 1 - Pr_n(\pi/2)/P_0 = 1 - |1 + (i-1)\psi_n B_0/\langle b_0|\psi\rangle|^2 \quad (4)$$

$$p_2 \to 1 - Pr_n(-\pi/2)/P_0 = 1 - |1 + (i-1)\psi_n B_0/\langle b_0|\psi\rangle|^2 \quad (5)$$

$$\mathrm{Re}[\psi_n] = 2 - \sqrt{4(1 - p_1 - p_2) - (p_1 - p_2)^2} \quad (6)$$

$$\mathrm{Im}[\psi_n] = p_1 - p_2 \quad (7)$$

$$\psi = 2 - 2\sqrt{\left(1 - p_1 - p_2 - \left(\frac{p_1 - p_2}{2}\right)^2\right) + i(p_1 - p_2)} \quad (8)$$

Redefining the wave function to give a probability proportional to $G_0$ yields $$\psi\sqrt{G_0} = 2G_0 - 2\sqrt{(G_1 + G_2 - G_0)G_0 - \left(\frac{G_1 - G_2}{2}\right)^2} + i(G_2 - G_1) \quad (9)$$

Here we substituted for the normalized $p_i$ variables $$p_0 = \frac{G_0}{G_0} = 1 \quad (10)$$

$$p_1 = 1 - \frac{G_1}{G_0} \quad (11)$$

$$p_2 = 1 - \frac{G_2}{G_0} \quad (12)$$

We note that this equation can be put into the following quadratic equation with simple coefficients.

$$\left(\frac{1}{2}(\psi - 2)\right)^2 + i(p_1 - p_2)\left(\frac{1}{2}(\psi - 2)\right) - (1 - p_1 - p_2) = 0 \quad (13)$$

We rescale the wave function as $\Delta\psi = \frac{1}{2}(\psi - 2)$ where the wavefunction $\Delta\psi$ can be put into standard notation $\Delta\psi = a + ib$. $(\Delta\psi)^2 + i(p_1 - p_2)\Delta\psi - (1 - p_1 - p_2) = 0$. We know from our scaling that $b = 1/[2(p_1 - p_2)]$ and $a^2 + b^2 = (1 - p_1 - p_2)$.

III. Wavefunction Measurement Using Symmetric Polarization Bases

Consider the wavefunction for the symmetric bases (F. Beduini et al. "*Interferometric measurement of the biphoton wave function*," Physical Review Letters 113 183602 (2014)), $$\psi = \left[(\overline{y} - y_0) + \frac{i(\overline{y_1} - \overline{y_2})}{\sqrt{3}}\right]/(2\gamma) \quad (19)$$

Where the overbar indicates the average of the indexed measured values where the index values are 0, 1, and 2. We put the y terms in the $G^{(2)}$ bases (R. Glauber, "*Coherent and*

*Incoherent States of the Radiation Field,*" Physical Review 131266 (1963)) to normalize the coincidences to compensate for the variability of the single photon counts. We note that is a solution to the following quadratic equation:

$$\gamma\psi^2 + \frac{i\psi(y_1 - y_2)}{\sqrt{3}} - \left[(\bar{y} - y_0)^2 + \frac{(y_1 - y_2)^2}{3}\right]\frac{1}{4\gamma} = 0 \tag{20}$$

A convenient reduced form can be found by dividing the equation by $\gamma^3$ and scaling each $\psi$ and y by dividing each by $\gamma$.

$$\psi^2 + i\psi\frac{1}{\sqrt{3}}(y_1 - y_2) - \left[(\bar{y} - y_0)^2 + \frac{1}{3}(y_1 - y_2)^2\right]\frac{1}{4} = 0 \tag{21}$$

We note that the variance terms are equal to one half of the variance about the mean $$\left[(\bar{y} - y_0)^2 + \frac{1}{3}(y_1 - y_2)^2\right]\frac{1}{4} = \frac{1}{2}\sum_{i=1}^{3}\frac{1}{3}(y_i - \bar{y})^2 = \frac{1}{2}\sigma^2 \tag{22}$$

It should be noted that the square modulus of $$\frac{i}{\sqrt{3}}(y_1 - y_2)$$

generated $$\frac{(y_1 - y_2)^2}{3}.$$

$$\psi^2 + i\psi(y_1 - y_2)\frac{1}{3} - \frac{\sigma^2}{2} = 0 \tag{23}$$

IV. Comparing the Wavefunction Measurement Methods

We derive a simple wavefunction identity to create a unified framework for comparison of the wavefunction measurements. Then we put the wavefunction measurement methods into that framework and compare the methods.

Nonlinear Wavefunction Identities

A well-known wavefunction equation ties the wavefunction to the probability through its complex conjugate. $\psi\psi^* = (a+ib)(a-ib) = a^2 + b^2 = p$. However, we introduce an alternate complex wavefunction identity that expresses the role of the wavefunction, phase and probability that turns out to be instrumental in our solving the wavefunction measurement problem. While the wavefunction is a linear function in its two probability amplitudes (a, b) the probability is a nonlinear function of the wavefunction. This is alternately expressed as $\psi^2 + i2b\psi = a^2 + b^2 = p$, which turns to be exceedingly useful in deriving expressions for measurement of the wavefunction, $(\Delta\psi)^2 + i(p_1-p_2)\Delta\psi - (1-p_1-p_2) = 0$. We substitute $\Delta\psi = a+ib$ and equate terms to see what a and b are and to establish other identities. From the imaginary terms b we find that $b = (\frac{1}{2})(p_1-p_2)$. We find for p the probability, $p = a^2 + b^2$ that $a^2 + b^2 - (1-p_1-p_2) = 0$ and $(1-p_1-p_2) = p$. This means that $(1-p_1-p_2)$ is proportional to a probability.

Orthogonal Wavefunction's Nonlinear Form

For the case $p_i = G_i/G_0$ multiply the $p_i$ expressions by $G_0$.

$$(\psi - 2\sqrt{G_0})^2 + i\frac{1}{\sqrt{G_0}}(G_2 - G_1)(\psi - 2\sqrt{G_0}) + (G_0 - G_1 - G_2) = 0 \tag{33}$$

$$\left(\frac{1}{2}(\psi - 2)\right)^2 + i(p_1 - p_2)\left(\frac{1}{2}(\psi - 2)\right) - (1 - p_1 - p_2) = 0 \tag{34}$$

$$\Delta\psi = \frac{1}{2}(\psi - 2) \tag{35}$$

$$(\Delta\psi)^2 + i(p_1-p_2)\Delta\psi - (1-p_1-p_2) = 0 \tag{36}$$

$$p = (1-p_1-p_2) \tag{37}$$

These equations describe a nonlinear equations relating the wavefunctions to the probability.

Symmetric Wavefunction's Nonlinear Form

The symmetric wavefunction's nonlinear normalized (reduced) form is given by $\psi'^2 + i\psi'(y'_1 - y'_2)/3 - (\frac{1}{2})\sigma'^2 = 0$ where $\gamma$ is a function of the $G_i$ terms and is used to nondimensionalize the wavefunction and coefficients, and the primed variables are the nondimensional forms, $\psi' = \psi/\gamma$ where $y'_i = y_i/\gamma^2$ for i=0, 1, 2 and the standard deviation of the $G^{(2)}$ about the mean is normalized by dividing by $\gamma^2$ and $\sigma' = \sigma/\gamma^2$.

Comparison of the Wavefunction's Orthogonal and Symmetric forms

We note that both the orthogonal and symmetric forms can be put into exactly the same form after nondimensional scaling.

Nonlinear Complex Wavefunction Form

Derived from wavefunction to account for wavefunction, phase and probability $\psi^2 + i2b\psi = a^2 + b^2 = p$.

Orthogonal form

Normalized by $G_0$, probability in terms of two p parameters made up from the $G^{(2)}$ terms, orthogonal measurement bases, probability found by accounting for phase dependence $(\Delta\psi)^2 + i(p_1-p_2)\Delta\psi = (1-p_1-p_2) = p$ Symmetric Form Normalized by $\gamma$, probability in terms of normalized variance of the measurements over the bases, symmetric measurement bases, probability found by accounting for phase dependence $$\psi'^2 + i\psi'\frac{(y'_1 - y'_2)}{3} = \frac{\sigma'^2}{2}.$$

Finding $\gamma$

We find the equation for $\gamma$ indicative of the properties of the probe, from the above equations. Ref [F. Beduini et al. "*Interferometric measurement of the biphoton wave function,*" Physical Review Letters 113183602 (2014)] indicates that usually $\gamma$ is real, but it is possible to have a complex $\gamma$. In our applications, when $\gamma$ was real, the algorithm worked as indicated. When $\gamma$ was complex we needed an auxiliary correction. Since we are probing with entangled photons we set the constraint that the probability is the sum of a probability amplitude with the similar magnitude as $\psi$ but with possibility a different phase from $\psi$ and that a probability associated with the superposition wavefunctions is equal to $P = \frac{1}{2}(\gamma\gamma^* + \psi\psi^*)$. This is different from Ref. [F.

Beduini *Entanglement and state characterisation from two photon interference*, Dissertation, ICFO, September (2015)] wherein γ was treated as an external coherent probe with known properties but independent of the SPDC entanglement system they were probing. Depending on what is needed, γγ*, ψψ*, or their sum represent probabilities and are measured in the experiment using our invention.

$$\gamma = \frac{1}{\sqrt{2}}\sqrt{\bar{y} + \sqrt{3\bar{y}^2 - 2\overline{y^2}}} \tag{10}$$

Ref [F. Beduini et al. *"Interferometric measurement of the biphoton wave function,"* Physical Review Letters 113183602 (2014)] provides the γ equation but does not provide a derivation. We independently derived it from the $G^{(2)}$ superposition and interference equations.

$$(y_i - \bar{y})^2 = 4[\sqrt{\gamma\gamma^* p}\cos(\theta_i - \phi)]^2 \tag{11}$$

$$(y_i - \bar{y})^2 = 4\gamma\gamma^* p \cos^2(\theta_i - \phi) \tag{12}$$

$$\overline{(y_i - \bar{y})^2} = \frac{4}{3}\gamma\gamma^* p\left[1 + \frac{1}{4} + \frac{1}{4}\right] = 2\gamma\gamma^* p \tag{13}$$

$$\overline{(y_i - \bar{y})^2} = \sigma^2 = 2\gamma\gamma^* p \tag{14}$$

We can make a change of variables to note the relation to the variances and standard deviations. We set $$p = \frac{1}{2}\sqrt{\sigma_1}\sqrt{\sigma_1} \tag{15}$$

and $$\gamma\gamma^* = \frac{1}{2}\sqrt{\sigma_2}\sqrt{\sigma_2} \tag{16}$$

then $$G_i^{(2)} = \frac{1}{2}\left[\sqrt{\sigma_1}\sqrt{\sigma_1} + \sqrt{\sigma_2}\sqrt{\sigma_2} + 2\sqrt{\sigma_1}\sqrt{\sigma_2}\cos(\Delta\phi_i)\right] \tag{17}$$

and $$\sigma^2 = 2\gamma\gamma^* p = \sigma_1 \sigma_2 \tag{18}$$

Here the overbar indicates the average of the measured indexed values where the "i" indices are implicitly or explicitly 0, 1, and 2. The variance of second order coherence averaged over the polarizations is equal to the product of the scaled probabilities, which can be viewed as standard deviations of the second order coherence. We deduce that for ideal data for a temporal and polarization entangled photon system, as is our system, then γγ* and ψψ* are the same. However, when the wavefunctions are derived from non-ideal data then γγ* differs from ψψ*. Of course, in general γ can differ from ψ in phase, since the biphoton may be affected by the phase difference between the modulated signal and idler photons. Thus when the wavefunction is computed from experimental data, the values of γ and ψ will both depend on the faithfulness of the measurements to the ideal entangled system. We have found the method over all to be reliable.

Examination of γ

Next we examine the equation for γ found in Ref [F. Beduini, *Entanglement and state characterisation from two photon interference*, Dissertation, ICFO, September (2015)] which represents a probe parameter and deduce under which cases it turns complex and the consequences.

$$\gamma = \frac{1}{\sqrt{2}}\sqrt{\bar{y} + \sqrt{3\bar{y}^2 - 2\overline{y^2}}} \tag{19}$$

Squaring the equation gives $$2\gamma^2 = \bar{y} + \sqrt{3\bar{y}^2 - 2\overline{y^2}} \tag{20}$$

Now rearrange the equation and square again.

$$(2\gamma^2 - \bar{y})^2 = 3\bar{y}^2 - 2\overline{y^2} \tag{21}$$

Expanding $$4\gamma^4 - 4\gamma^2\bar{y} + \bar{y}^2 = 3\bar{y}^2 - 2\overline{y^2} \tag{22}$$

Isolating the variance of y on the right yields $$4\gamma^4 - 4\gamma^2\bar{y} = -2(\overline{y^2} - \bar{y}^2) = -2\sigma^2 \tag{23}$$

We note the term on the right is negative. Solving this equation for $\gamma^2$.

$$\gamma^4 - \gamma^2\bar{y} + \frac{1}{2}\sigma^2 = 0 \tag{24}$$

$$\gamma^2 = \frac{1}{2}\bar{y}\left(1 \pm \sqrt{1 - \frac{2\sigma^2}{\bar{y}^2}}\right) \tag{25}$$

If $$\frac{2\sigma^2}{\bar{y}^2} > 1$$

then the term $$\sqrt{1 - \frac{2\sigma^2}{\bar{y}^2}}$$

becomes imaginary and complex solutions are obtained.

$$\gamma^4 - 2\gamma^2\bar{y} + \frac{\sigma^2}{4} = 0 \tag{26}$$

Divide by $\gamma^4$ and set $$y' = \frac{\bar{y}}{\gamma^2} \tag{27}$$

$$\sigma' = \frac{\sigma^2}{\gamma^4} \tag{28}$$

-continued $$1 - \overline{y'} + \frac{1}{2}\overline{\sigma'^2} = 0 \qquad (29)$$

$$\overline{y'} = 1 + \frac{1}{2}\overline{\sigma'^2} \qquad (30)$$

The resealed equations show the relation between the mean and the variance about the mean in non-dimensional units. Note that in the sections above, $y_i$ is shorthand for measured $G^{(2)}$ or coincidence counts for some specified time interval dT at a specified set of phase orientations for each i=0, 1, 2. The overbar indicates the average of the measured indexed values where the index values are 0, 1, and 2.

FIG. 1 is a graphical representation of the physics supporting a preferred embodiment of the invention. A pulsed pump laser 10 excites a four-wave mixing (FWM) process in a nonlinear optical fiber. The nonlinear optical fiber is configured in a Sagnac loop 11 wherein pump photons with H polarization propagate, for example on a clockwise path, and pump photons with vertically polarized (V) polarization propagate in a counter clockwise direction. The FWM physics are such that signal and idler pulsed entangled photons are generated 12 so that 2 pump photons create 1 signal (higher energy) and 1 idler photon (lower energy). The generated signal and idler photons have polarization orthogonal to the polarization of the pump photons that created the signal and idler.

After exiting the Sagnac loop 11 the signal and idler photons are separated by wavelength with the signal photon propagating along the upper path 13 and the idler photon propagating along the lower path 14. Note that the signal and idler photons are entangled in polarization and in time 15. The idler photon may interact with a phase modulator 16 prior to measurement on polarization sensitive detector D2. The signal photon interacts with a path splitting element that directs the signal photon of the entangled photon to a phase modular with 0 applied phase, a phase modulator with $+\pi/2$ applied phase, or a phase modulator with $-\pi/2$ applied phase.

After the modulator the modulated signal photon is measured by polarization sensitive detector $D_3$, $D_1$ or $D_0$ respectively 17. Coincident measurements are counted between detector $D_2D_3$, $D_0D_2$, and $D_1D_2$. The measured coincidences and $G^{(2)}$s, also known as post selected measurements, and associated modulator phase values are used to then compute the wavefunction amplitude and wavefunction phase for the generated entangled photons 12.

Figure 2:
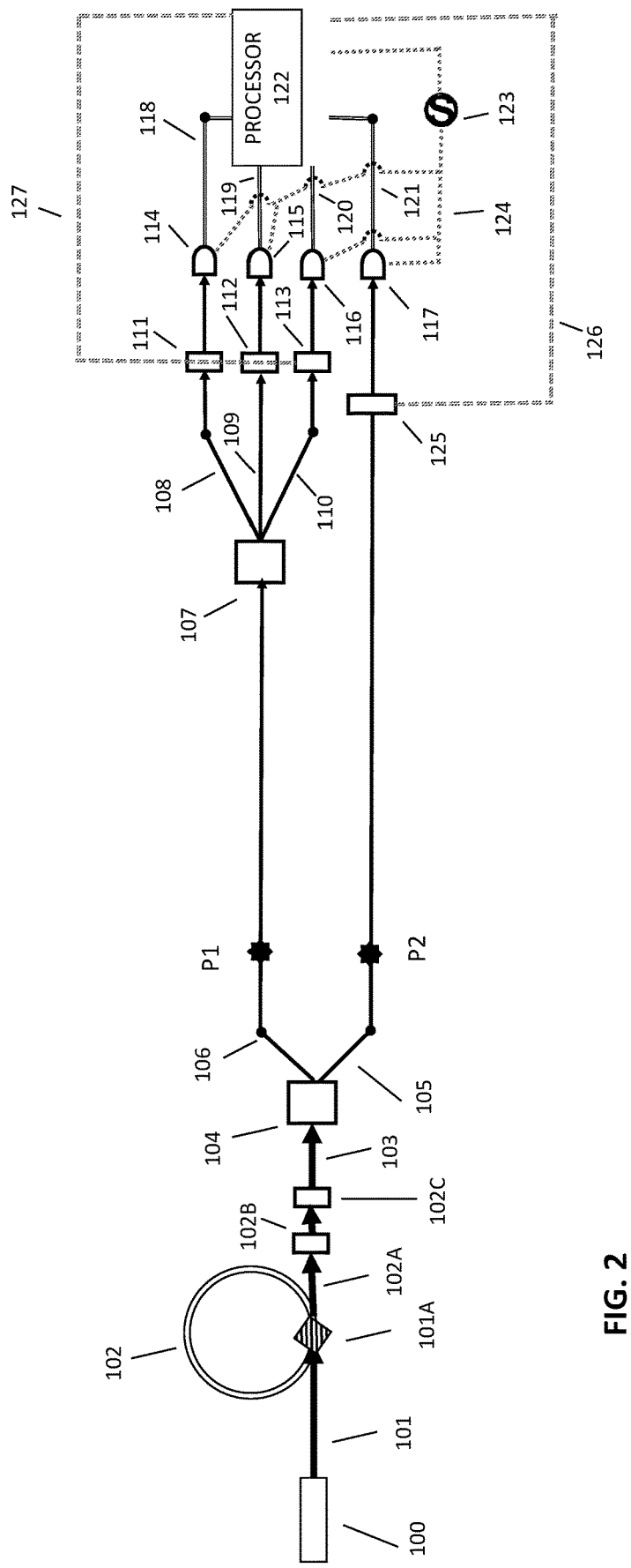
FIG. 2 is a schematic block diagram illustration of a preferred embodiment of the biphoton wavefunction measurement system using a pulsed laser and nonlinear Sagnac loop to generate biphoton (entangled) pairs and simultaneous measurements of coincidences and single photons with specified phase modulations.

FIG. 2 is a schematic illustration of a preferred embodiment for the measurement of the biphoton wavefunction. A pulsed laser 100 provides photons traversing path 101 to polarizing beamsplitter (PBS) 101A. PBS 101A inputs polarized photons to a nonlinear fiber Sagnac loop 102. The pulsed laser photons in the nonlinear fiber Sagnac loop 102 generate biphoton pairs in a four-wave mixing process (FWM) at signal and idler wavelengths wherein the sum of the energies of the signal and idler photons are equal to the energy of two photons of the inputted pulse source laser. The FWM generated photon pairs are orthogonal to the polarization of the input photons from the source.

On exiting the Sagnac loop 102 the photons are directed along path 102A to polarization rotator 102B. Polarization rotator rotates the polarization of an input photon by 45 degrees. Polarization rotator 102B operates to eliminate which-path information from the generated biphoton pairs. After polarization rotator 102B photons are directed to filter 102C. Filter 102C blocks photons with the wavelength of the photon source and transmits photons at signal and idler wavelengths. The filtered biphoton pairs are directed along path 103 to wavelength dependent path switch 104. Path switch 104 may be, for example, a wave-division multiplexer which operates to direct photons of one wavelength along path 106 and photons of another wavelength along path 105.

The wavelengths in the current embodiment are chosen to be the signal and idler wavelengths centered on the pump central wavelength. One photon of each biphoton is directed to propagate on path 106 (P1) or path 105 (P2). The P2 photon is directed to interact with phase modulator 125. Modulator 125 applies a user specified phase modulation to the P2 photons. The phase modulation setting is applied by computer/processor 122 with the phase modulation setting being transmitted along path 126. Photon P2 after modulator 125 is directed to photon detector 117.

Photon detector 117 is gated by a signal from clock 123 to only measure photons at specified times. The timing information is provided to detector 117 along path 124. Detector 117 includes a polarizer at a fixed orientation such that, for example, a horizontally polarized (H) photon would be transmitted and measured to generate a detection event, e.g. 1, while a vertically polarized (V) photon would be absorbed or redirected to generate a non-detection event, e.g. 0, for a specified gate time. Detector 117 is thus a polarization sensitive detector.

Detection events by detector 117 are sent to computer/processor 122 along path 121. Photons P1 propagating on path 106 are directed to interact with path splitter 107. Path splitter 107 operates to direct input photons from 106 to paths 108, 109 or 110 with a known probability. Path splitter 107 may be as an example a 1×3 fiber coupler where an input photon is directed to each output path with a probability of 1/3 or may be comprised of three 2×2 fiber couplers with a first fiber coupler outputting to one each of the remaining (secondary) 2×2 fiber couplers. The two of the outputs of the first of the secondary 2×2 fiber couplers are directed to path 108 and 109. The outputs of the second of the secondary 2×2 couplers are directed to path 110 and the other output to a beam stop or photon absorber. In the three 2×2 fiber coupler configuration there is a probability of 1/4 that a photon will enter into paths 108, 109 or 110.

A photon P1 propagating on path 108 interacts with phase modulator 111. Phase modulator 111 applies a specified phase to input P1 photons. The phase to be applied by modulator 111 is provided by processor 122 along path 127. Photon P1 after modulator 111 is directed to polarization sensitive detector 114. Detector 114 is gated by a signal from clock 123 to only measure photons at specified times. The timing information is provided to detector 114 along path 124. Detection events by detector 114 are sent to computer/processor 122 along path 118.

A photon P1 propagating on path 109 interacts with phase modulator 112. Phase modulator 112 applies a specified phase to input P1 photons. The phase to be applied by modulator 112 is provided by processor 122 along path 127. Photon P1 after modulator 112 is directed to polarization sensitive detector 115. Detector 115 is gated by a signal from clock 123 to only measure photons at specified times. The timing information is provided to detector 115 along path 124. Detection events by detector 115 are sent to computer/processor 122 along path 119.

A photon P1 propagating on path 110 interacts with phase modulator 113. Phase modulator 113 applies a specified phase to input P1 photons. The phase to be applied by modulator 113 is provided by processor 122 along path 127. Photon P1 after modulator 113 is directed to polarization sensitive detector 116. Detector 116 is gated by a signal from clock 123 to only measure photons at specified times. The timing information is provided to detector 116 along path 124. Detection events by detector 116 are sent to computer/processor 122 along path 120. Computer/Processor 122 determines coincident events between detectors 114, 117; detectors 115, 117; and detectors 116, 117.

Optionally computer/processor 122 may compute $G^{(2)}$ values for each detector pair. Computer/processor 122 then determines the wavefunction from the measured coincidence or $G^{(2)}$ values consistent with the applied phase settings to phase modulators 111, 112, 113 and 125. The computer/processor now stores and may optionally display the results of the wavefunction calculations. It must be appreciated that the entangled photon source prior to wavelength dependent path switch 104 may include, but is not limited to, entangled photons generated in FWCM processes, SPDC processes, atom-atom interactions, or similar approaches to generate entangled photons.

Figure 3:
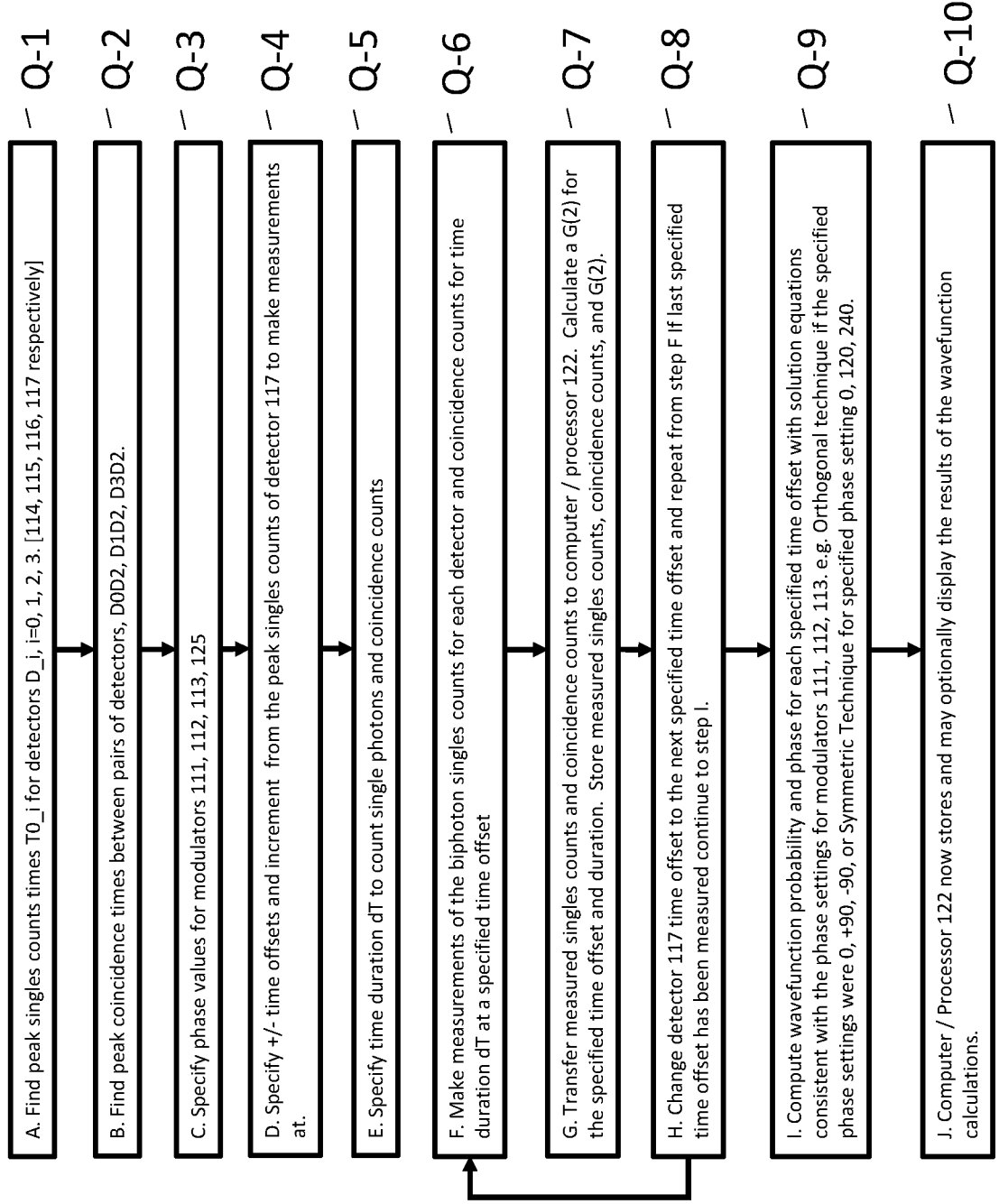
FIG. 3 is a schematic block diagram illustration of the process steps of a preferred embodiment biphoton wavefunction measurement system.

FIG. 3 is an example of a methodology for a preferred embodiment of the simultaneous measurement of the biphoton wavefunction amplitude and phase. The methodology is comprised of the following steps. In step Q0 the method for the measurement of the wavefunction either by the symmetric or orthogonal technique is selected by the user. In step Q1 the time positions of the maxima of the measured single photon counts on detectors $D_i$, i=0, 1, 2, 3 relative to a clock are determined. The clock may be synchronized with the repetition rate of a pulsed entangled photon system.

In step Q2 the time differentials between pairs of detectors $D_0D_2$, $D_1D_2$, and $D_2D_3$ are determined that maximize the coincident detection events between each pair of detectors. In step Q3 the phase settings for modulators 111, 112, 113, and 125 are determined by the user. For example to measure the wavefunction with the orthogonal technique modulator 111 would be set to a phase of 90; modulator 112 set to 270; modulator 113 set to 0; Modulator 125 for this example is typically set to 0.

In step Q4 the temporal range over which to measure the wavefunction is specified. This range may be chosen to scan over the entire source pump width. For the current example a range of −150 ps to +150 ps around the peak singles count time for detector 117 in increments of 5 ps may be specified. In step Q5, the measurement duration is specified. This duration may be specified in seconds or in the number of entangled photon source pulses which is proportional to seconds. In step Q6 measurement of single photon counts and coincidence counts at a specified time offset are made.

In step Q7, the measurements of the single photon counts and coincidence counts are transferred to computer/processor 122. A value of $G^{(2)}$ is calculated at the specified time offset. The measured single photon counts, coincidence counts and $G^{(2)}$ are stored. In step Q8 the current time delay is tested to determine if it was the final time delay, if the time delay is not the final time delay then the process returns to Q6 after changing the time delay to the next time delay. If the current time delay was the last time delay the process proceeds to Q9.

In step Q9 the wavefunction probability and phase are computed for each specified time offset in accordance with the phase value specified in step Q3. For example, equations for finding the wavefunction probability and phase for the orthogonal bases are employed if the phases specified were 0, 90, 270, and the equations for finding the wavefunction probability and phase for symmetric bases if the specified phases were 0, 120, and 240.

In step Q9.1 the wavefunction amplitude and phase are calculated. If the Orthogonal technique was selected compute $p_0$, $p_1$, $p_2$ using equations 10, 11, and 12 from the Wavefunction Measurement Using Orthogonal Polarization Bases section using the measured values. Then compute the wavefunction (ψ) probability amplitudes using equation 8. The phase of the wavefunction is computed as the ATAN [IMAG(ψ)/REAL(ψ)].

If the Symmetric technique was selected compute γ from the measured values using equation 10 from the Finding Gamma section, using the computed γ to determine the wavefunction (ψ) probability amplitudes using equation 19 from the Wavefunction Measurement Using Symmetric Polarization Bases section. The phase of the wavefunction is computed as the ATAN[IMAG(ψ)/REAL(ψ). In step Q10 computer/processor 122 now stores and may optionally display the amplitude and phase for each time offset of the biphoton wavefunction.

Figure 4:
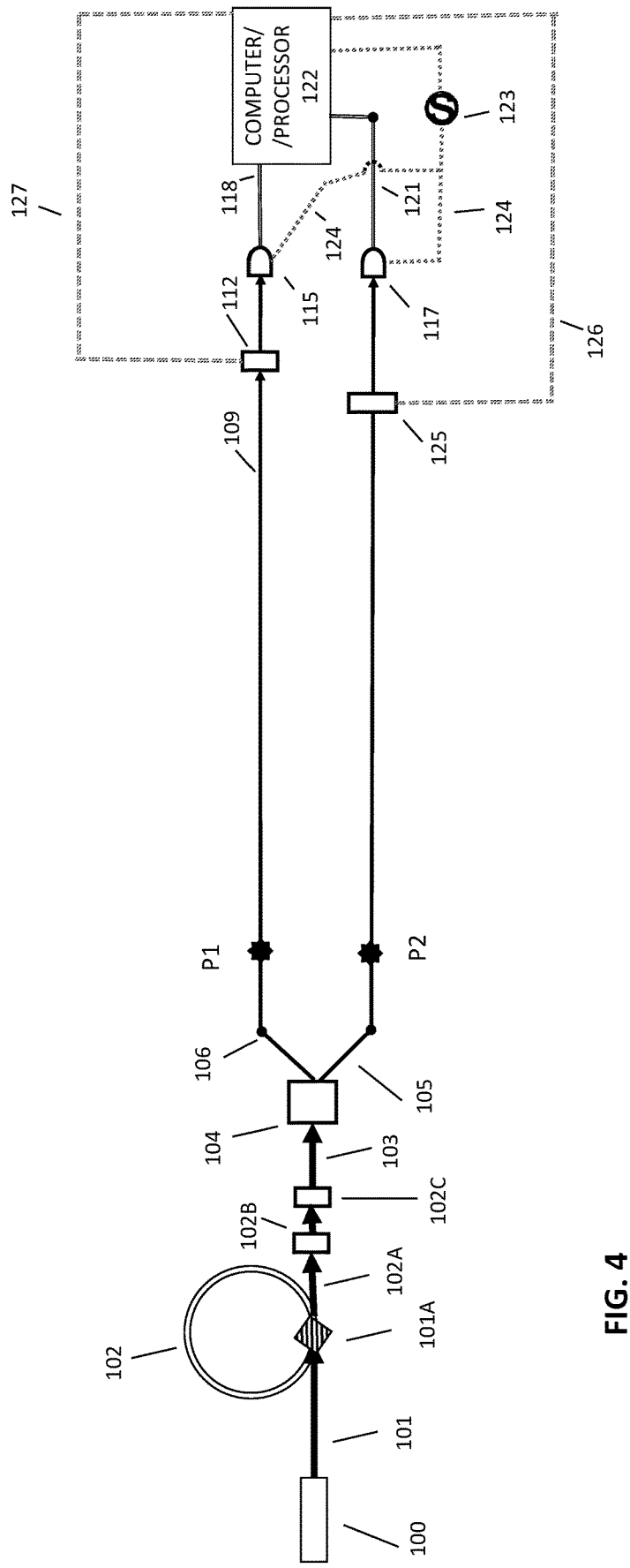
FIG. 4 is a schematic block diagram illustration of a preferred embodiment biphoton wavefunction measurement system using a pulsed laser and nonlinear Sagnac loop to generate biphoton (entangled) pairs and sequential measurements of coincidences and single photons with specified phase modulation.

FIG. 4 is a schematic illustration of a preferred embodiment for the measurement of the biphoton wavefunction. A pulsed laser 100 provides photons traversing path 101 to polarizing beamsplitter (PBS) 101A. PBS 101A inputs polarized photons to a nonlinear fiber Sagnac loop 102. The pulsed laser photons in the nonlinear fiber Sagnac loop generate biphoton pairs in four wave mixing process (FWM) at signal and idler wavelengths wherein the sum of the energies of the signal and idler photons are equal to the energy of two photons of the inputted pulse source laser. The FWM generated photon pairs are orthogonal to the polarization of the input photons from the source.

On exiting the Sagnac loop the photons are directed along path 102A to polarization rotator 102B. Polarization rotator rotates the polarization of an input photon by 45 degrees. Polarization rotator 102B operates to eliminate which-path information from the generated biphoton pairs. After polarization rotator 102B photons are directed to filter 102C. Filter 102C blocks photons with the wavelength of the photon source and transmits photons at signal and idler wavelengths. The filter biphoton pairs are directed along path 103 to wavelength dependent path switch 104. The path switch may be, for example, a wave-division multiplexer which operates to direct photons of one wavelength along path 106 and photons of another wavelength along path 105.

The wavelengths in the current embodiment are chosen to be the signal and idler wavelengths centered on the pump central wavelength. One photon of each biphoton is directed to propagated on path 106 (P1) or path 105 (P2). The P2 photon is directed to interact with phase modulator 125. Modulator 125 applies a user specified phase modulation to the P2 photons. The phase modulation setting is applied by Computer/Processor 122 with the phase setting being transmitted along path 126.

Photon P2 after modulator 125 is directed to photon detector 117. Photon detector 117 is gated by a signal from clock 123 to only measure photons at specified times. The timing information is provided to detector 117 along path 124. Detector 117 includes a polarizer at a fixed orientation such that, for example, a horizontally polarized (H) photon would be transmitted and measured to generate a detection event, e.g. 1, while a vertically polarized (V) photon would be absorbed or redirected to generate a non-detection event, e.g. 0, for a specified gate time. Detector 117 is thus a polarization sensitive detector.

Detection events by detector 117 are sent to computer/processor 122 along path 121. Photons P1 propagating on path 106 are coupled to path 109. Photon P1 propagating on path 109 interacts with phase modulator 112. Phase modulator 112 applies a specified phase to input P1 photons. The phase to be applied by modulator 112 is provided by processor 122 along path 127. Photon P1 after modulator 112 is directed to polarization sensitive detector 115. Detector 115 is gated by a signal from clock 123 to only measure photons at specified times. The timing information is provided to detector 115 along path 124. Detection events by detector 115 are sent to computer/processor 122 along path 118.

This embodiment is configured to make measurements of specified phase settings consistent with the type of wavefunction measurement bases (e.g. orthogonal or symmetric) to be used to calculate the wavefunction amplitude and phase sequentially. For example, all measurements at the first phase setting for all specified times are performed, then all measurements at the second phase setting for all the specified times are performed, then finally all the measurements at the third phase setting as the specified are performed. Computer/Processor 122 determines coincident events between detectors 115, 117. Optionally computer/processor 122 may compute a $G^{(2)}$ value for each detector pair.

Computer/processor 122 then determines the wavefunction from the measured coincidence or $G^{(2)}$ values consistent with the applied phase settings to phase modulators 112 and 125. The computer/processor 122 now stores and may optionally display the results of the wavefunction calculations. It must be appreciated that the entangled photon source prior to wavelength dependent path switch 104 may include, but is not limited to, entangled photons generated in SPDC processes, atom-atom interactions, or similar approaches to generate entangled photons.

Figure 5:
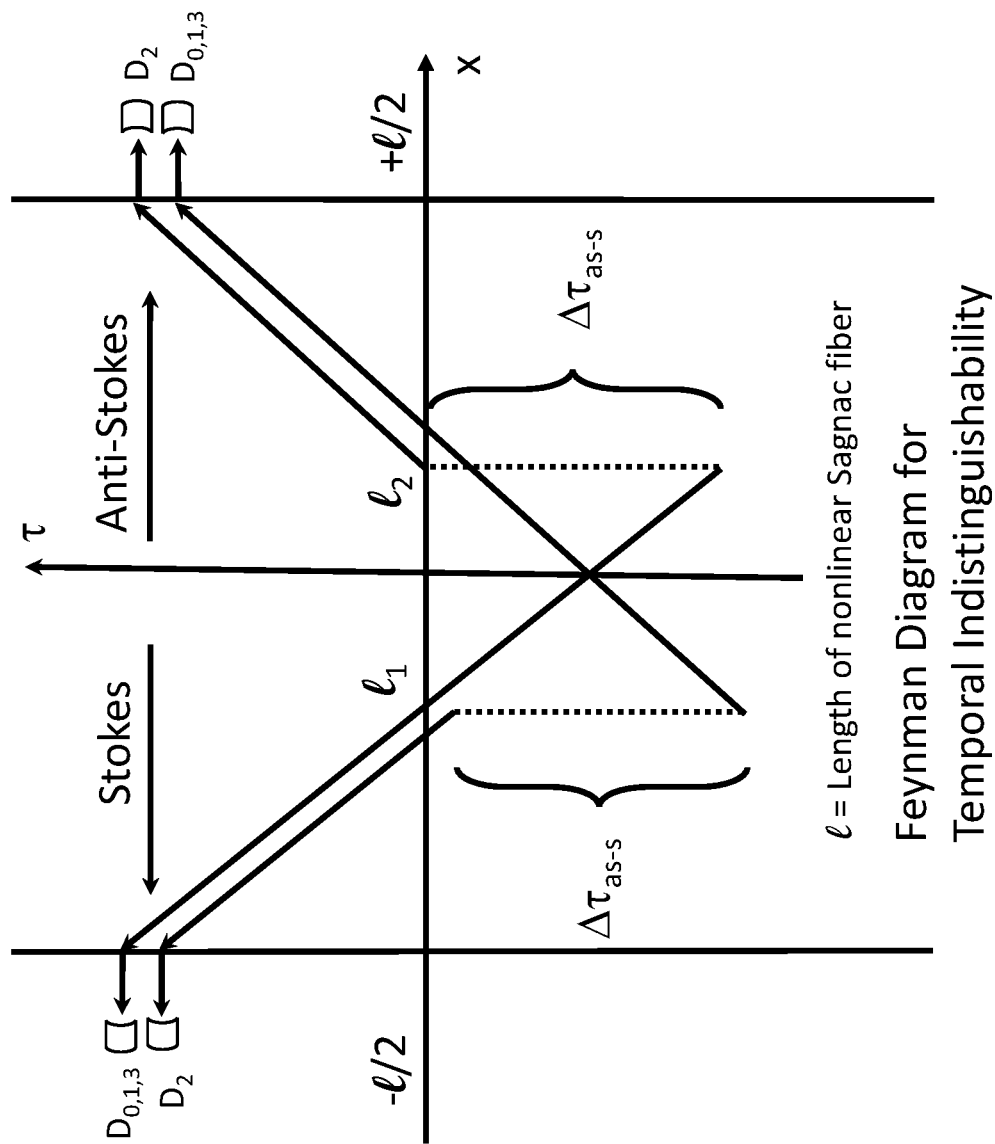
FIG. 5 is a depiction of the physics for temporal indistinguishability for measurement of a biphoton wavefunction.

FIG. 5 is a graphic representation of the physics of temporal indistinguishability of four wave mixing (FWM) entangled photon pairs generated in a nonlinear fiber. We know that a signature of FWM is that there is a local minimum in the coincidences at the initial time since the Stokes and anti-Stokes photon are generated at different times. S. Du, E. Oh, J. Wen and M. Rubin, et al. "*Four-wave mixing in three-level systems: Interference and entanglement*," Physical Review A 76, 013803 (2007) worked out the temporal indistinguishability physics and Feynman diagrams for the biphoton generation in a FWM Rubidium $\chi^{(3)}$ media.

FIG. 5 depicts the Feynman diagram applied to our nonlinear optical fiber system that generated polarization and temporal entangled photons. There is temporal indistinguishability on when the entangled photons were generated and the direction they are traveling due to the Sagnac configuration in the nonlinear fiber.

Figure 6:
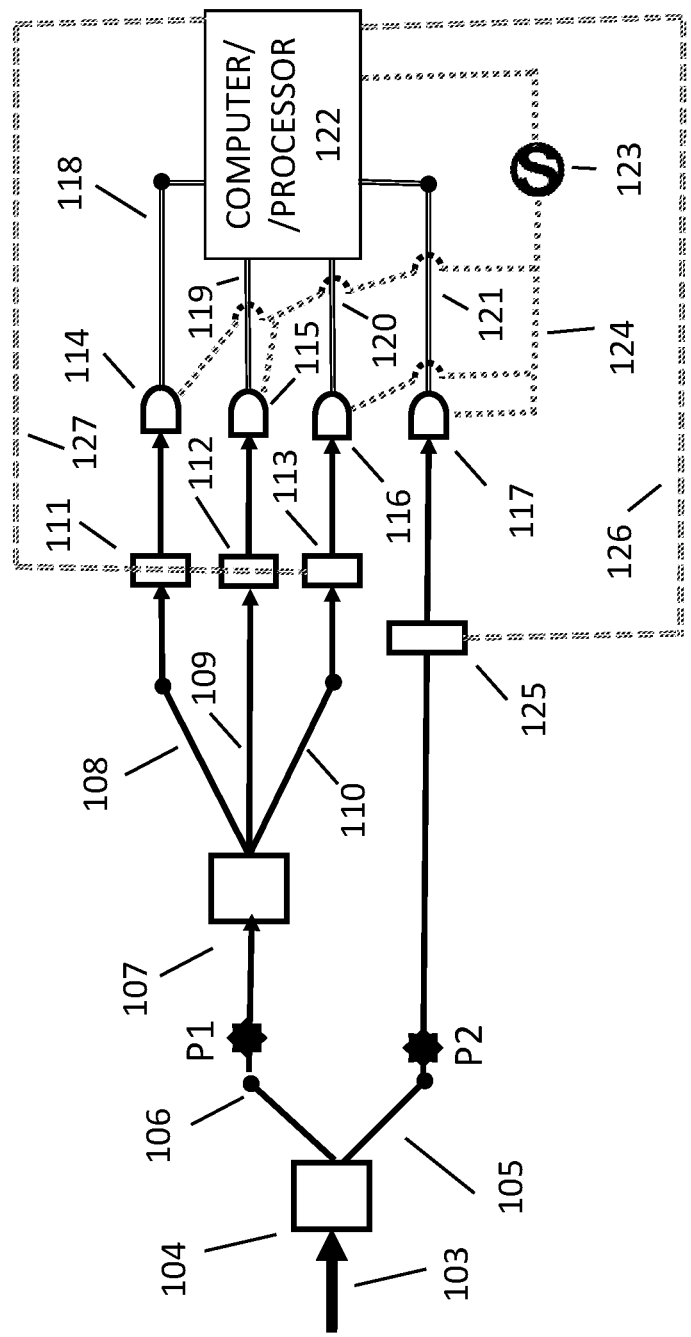
FIG. 6 is a schematic block diagram for a component to measure the biphoton wavefunction.

FIG. 6 is a schematic illustration of a preferred embodiment for the measurement of the biphoton wavefunction. The biphoton pairs are input along path 103 to wavelength dependent path switch 104. The path switch may be, for example, a wave-division multiplexer which operates to direct photons of one wavelength along path 106 and photons of another wavelength along path 105.

The wavelengths in the current embodiment are chosen to be the signal and idler wavelengths centered on the pump central wavelength. One photon of each biphoton is directed to propagated on path 106 (P1) or path 105 (P2). The P2 photon is directed to interact with phase modulator 125. Modulator 125 applies a user specified phase modulation to the P2 photons. The phase modulation setting is applied by Computer/Processor 122 with the phase setting being transmitted along path 126. Photon P2 after modulator 125 is directed to photon detector 117.

Photon detector 117 is gated by a signal from clock 123 to only measure photons at specified times. The timing information is provided to detector 117 along path 124. Detector 117 includes a polarizer at a fixed orientation such that, for example, a horizontally polarized (H) photon would be transmitted and measured to generate a detection event, e.g. 1, while a vertically polarized (V) photon would be absorbed or redirected to generate a non-detection event, e.g. 0, for a specified gate time. Detector 117 is thus a polarization sensitive detector. Detection events by detector 117 are sent to computer/processor 122 along path 121. Photons P1 propagating on path 106 are directed to interact with path splitter 107.

Path splitter 107 operates to direct input photons from 106 to paths 108, 109 or 110 with a known probability. Path splitter 107 may be as an example a 1×3 fiber coupler where an input photon is directed to each output path with a probability of 1/3 or may be comprised of three 2×2 fiber couplers with a first fiber coupler outputting to one each of the remaining (secondary) 2×2 fiber couplers. Two of the outputs of the first of the secondary 2×2 fiber coupler are directed to path 108 and 109. The outputs of the second of the secondary 2×2 coupler are directed to path 110 and to a beam stop or photon absorber.

In this configurations there is a probability of 1/4 that a photon will enter into paths 108, 109 or 110. A photon P1 propagating on path 108 interacts with phase modulator 111. Phase modulator 111 applies a specified phase to input P1 photons. The phase to be applied by modulator 111 is provided by processor 122 along path 127. Photon P1 after modulator 111 is directed to polarization sensitive detector 114. Detector 114 is gated by a signal from clock 123 to only measure photons at specified times. The timing information is provided to detector 114 along path 124. Detection events by detector 114 are sent to computer/processor 122 along path 118.

A photon P1 propagating on path 109 interacts with phase modulator 112. Phase modulator 112 applies a specified phase to input P1 photons. The phase to be applied by modulator 112 is provided by processor 122 along path 127. Photon P1 after modulator 112 is directed to polarization sensitive detector 115. Detector 115 is gated by a signal from clock 123 to only measure photons at specified times. The timing information is provided to detector 115 along path 124. Detection events by detector 115 are sent to computer/processor 122 along path 119.

A photon P1 propagating on path 110 interacts with phase modulator 113. Phase modulator 113 applies a specified phase to input P1 photons. The phase to be applied by modulator 113 is provided by processor 122 along path 127. Photon P1 after modulator 113 is directed to polarization sensitive detector 116. Detector 116 is gated by a signal from clock 123 to only measure photons at specified times. The timing information is provided to detector 116 along path 124. Detection events by detector 116 are sent to computer/processor 122 along path 120. The biphoton pairs input along path 103 may be provided by, for example, a lens illuminating an array of pixels as in an electronic camera where a pixel is represented by device element 103.

Figure 7:
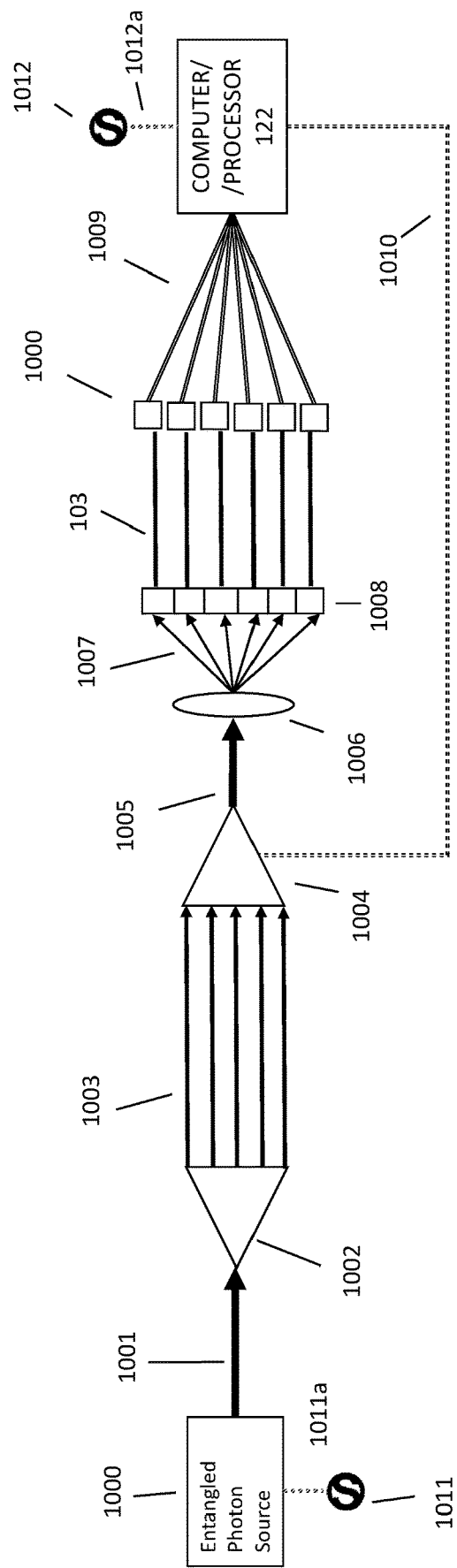
FIG. 7 is a schematic block diagram of a preferred embodiment biphoton wavefunction measurement system that would allow measurement of the biphoton probabilities and phase as a function of space and time.

FIG. 7 is a schematic illustration of a preferred embodiment for the measurement of the biphoton wavefunction as a function of space and time. Entangled photon source (EPS) 1000 provides entangled (biphoton) pairs along path 1001 to telescope/beam expander 1002. EPS 1000 may be associated with a clock 1011. Clock 1011 may be operatively associated with the pulse repetition rate of 1000 or optionally synchronized with other timing sources such as atomic clocks or GPS signals. The clock signal is provided to 1000 along path 1011a.

Biphotons after component 1002 propagate along paths 1003 which may traverse phase distortions such as turbulence, optical turbulence or scattering media. The optical paths 1003 are sampled by a telescope/beam expander 1004. Telescope 1004 may be optionally associated with adaptive optics elements configured to maximize the number of biphotons received. After telescope 1004 the biphotons propagate along optical path 1005 to lens 1006. Lens 1006 is configured to distribute incoming biphotons to pixels 1008 along paths 1007. Pixels 1008 may optionally be a microlens array coupled to optical paths 103. Optical paths 103 are the paths input photons from some spatial pixel element are propagated to a biphoton wavefunction measurement component 1000 (see FIG. 6). The biphoton wavefunction measurement components are operatively associated with a spatial position based on the pixel each is connected to. Component 1000 measures the single photons and coincident photons using specified phase values supplied along paths 1009 by the user and computer/processor 122.

Computer/processor 122 may be operatively associated with clock 1012 along path 1012a. Clock 1012 may be associated with Clock 1011 or other timing source such as an atomic clock or GPS signal. The clock 1012 may provide the timing signal for element 123 of FIG. 6. Components 1000 supply the generated wavefunction to computer/processor 122 along paths 1009. Computer/processor 122 can generate temporal and spatial distributions of the measured biphoton wavefunction. This information can be provided to the optional adaptive optics elements of 1004 to improve the measured biphoton wavefunctions with the corrective information transmitted along path 1010.

Figure 8:
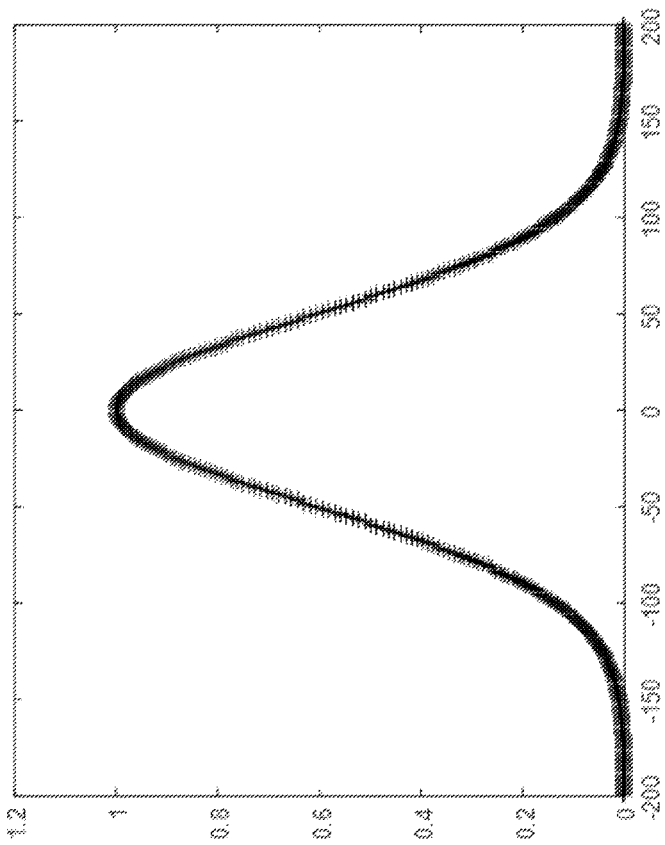
FIG. 8 is an example of results for the wavefunction probability computed using the orthogonal basis technique and analytic $G^{(2)}$ values.

FIG. 8 shows an example of the wavefunction probability computed using the orthogonal basis technique and analytic $G^{(2)}$ values. The vertical axis is the probability of measurement and the horizontal axis is the time offset for detector 117 measurements.

Figure 9:
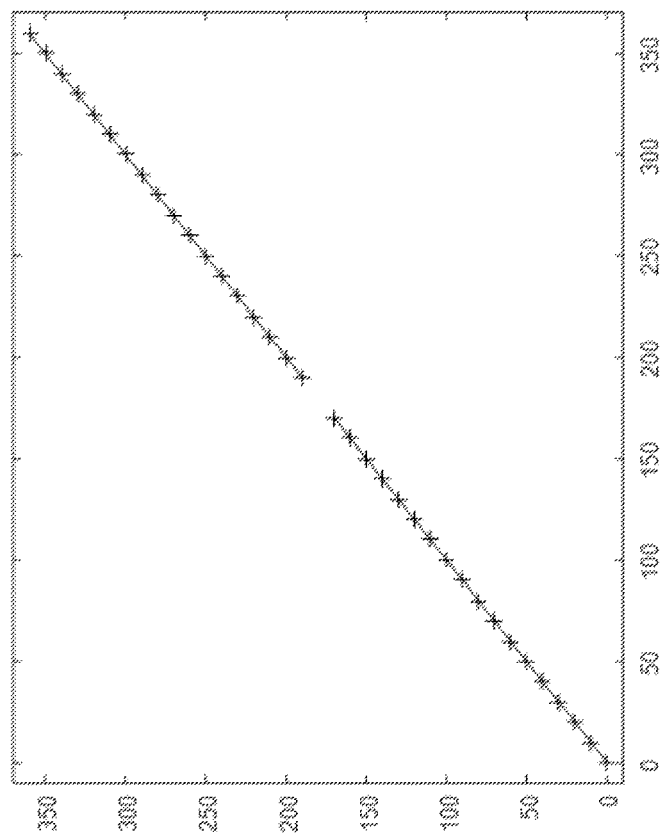
FIG. 9 is an example of the results for the wavefunction phase for a set of modulator settings using the orthogonal basis technique and analytic $G^{(2)}$ values.

FIG. 9 shows an example of the wavefunction phase computed using the orthogonal basis technique for representative values of modulator 125 settings of and analytic $G^{(2)}$ values. The vertical axis is the computed wavefunction phase and the bottom axis is the input phase for modulator 125. Note that the gap in the drawn phase for 180 input phase is due to two of the analytical $G^{(2)}$ values being identical and numerically yielding an indeterminate result, e.g. a divide by 0.

Figure 10:
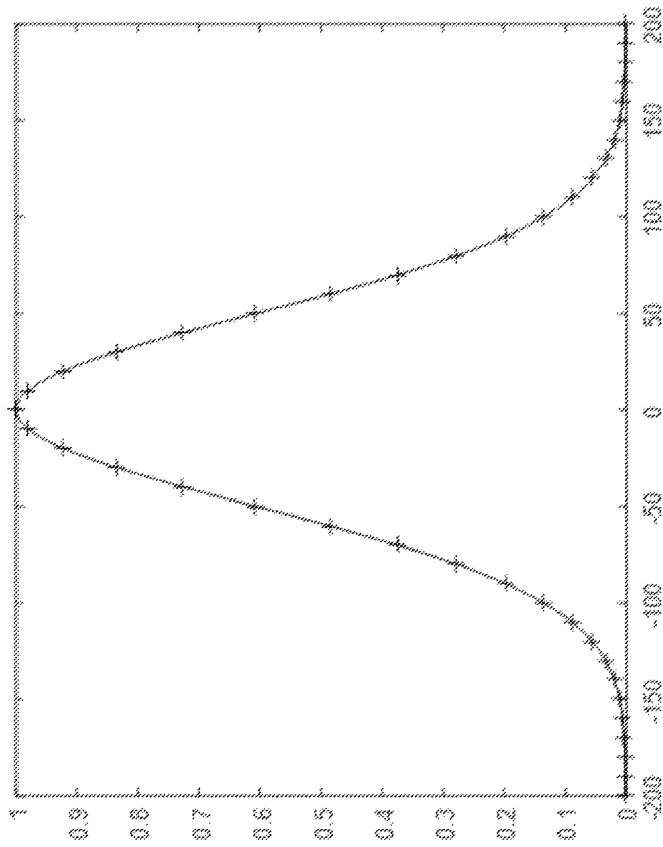
FIG. 10 is an example of results for the wavefunction probability computed using the symmetric basis technique and analytic $G^{(2)}$ values.

FIG. 10 shows an example of the wavefunction probability computed using the symmetric basis technique and analytic $G^{(2)}$ values. The vertical axis is the probability of measurement and the horizontal axis is the time offset for detector 117 measurements.

Figure 11:
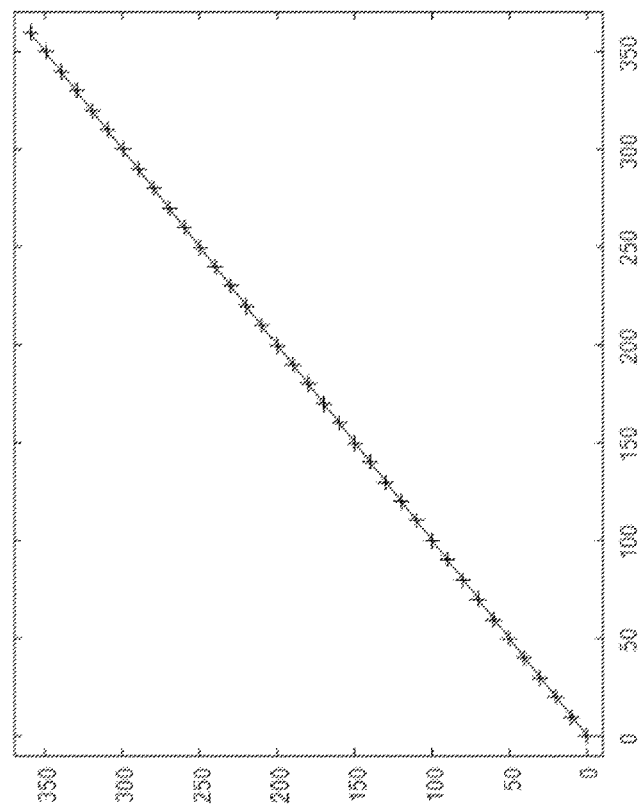
FIG. 11 is an example of the results for the wavefunction phase for a set of modulator settings using the symmetric basis technique and analytic $G^{(2)}$ values.

FIG. 11 shows an example of the wavefunction phase computed using the symmetric basis technique for representative values of modulator 125 settings of and analytic $G^{(2)}$ values. The vertical axis is the computed wavefunction phase and the bottom axis is the input phase for modulator 125.

Figure 12:
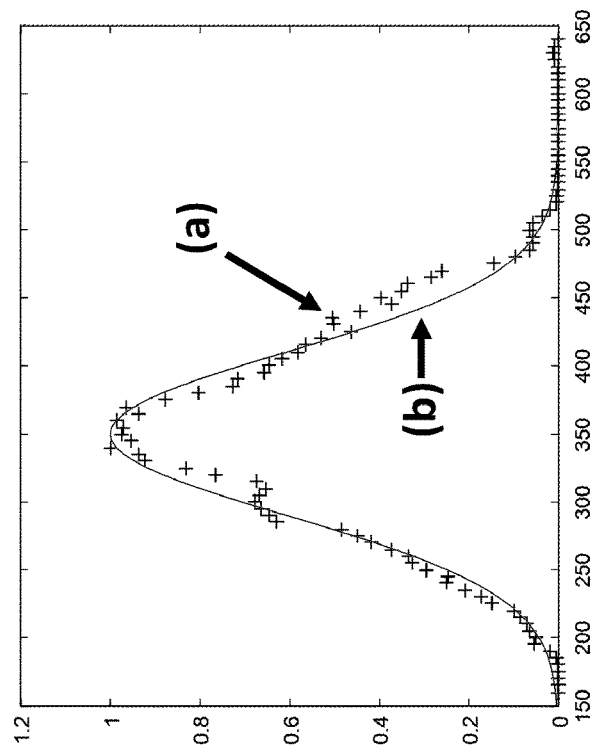

FIG. 12 shows an example of the wavefunction probability computed using the orthogonal basis technique and measured $G^{(2)}$ values. The vertical axis is the probability of measurement and the horizontal axis is the time offset for detector 117 measurements. The values indicated by (a) are the computed wavefunction probabilities. The solid line (b) is a Gaussian with a sigma of 60 ps to guide the eye.

Figure 13:
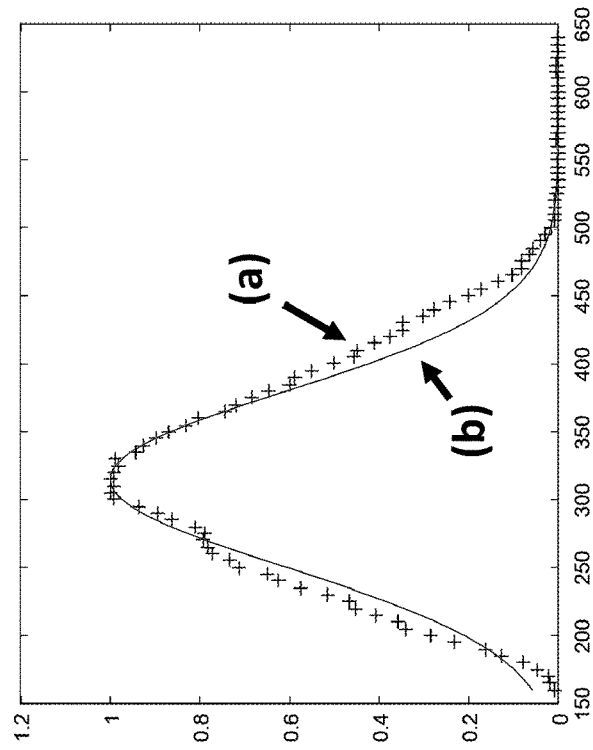
FIG. 13 is an example of results for the wavefunction probability computed using the orthogonal basis technique and measured $G^{(2)}$ values.

FIG. 13 shows an example of the wavefunction probability computed using the symmetric basis technique and measured $G^{(2)}$ values. The vertical axis is the probability of measurement and the horizontal axis is the time offset for detector 117 measurements. The values indicated by (a) are the computed wavefunction probabilities. The solid line (b) is a Gaussian with a sigma of 65 ps to guide the eye.

As used herein the terminology "channel" means that the entangled photon pairs have two further measurable properties such as wavelength where, for example, one photon of the entangled pair can be measured at wavelength A and the other photon of the entangled pair can be measured at wavelength B. An exemplary example of a device that can separate an input signal into distinct channels is a wave division multiplexer (WDM). A wave division multiplexer operates on the principle of wavelength diffraction. In wavelength diffraction, when light of a specific wavelength interacts with the diffracting media it is reflected or transmitted at a specific angle. In a typical fiber optic WDM two wavelengths are input into the device which is built to transmit or "pass" one wavelength and reflect all other wavelengths. This can be used to combine two distinct wavelengths into a single fiber called "common" with low loss.

Similarly, if two wavelengths are input along the "common" path, the "pass" wavelength will be transmitted and all other wavelengths will be reflected into a "reflected" path. So, to combine two wavelengths the pass wavelength is input on the "pass" path and other wavelengths are input into the reflection path. The input on the "pass" path is transmitted into the "common" path and the input on the "reflection" path is reflected into the "common" path. To separate multiple wavelengths, a multiple wavelength single is input along the "common" path, the "pass" wavelength is transmitted into the "pass" path and all other wavelengths are reflected into the "reflect" path.

It should be recognized, that commercially available WDMs operating in the telecom range have a set of defined pass wavelengths and are labeled at ITU channels. Each channel is 100 GHz wide in frequency units, about 0.8 nm wide in wavelength units, with a small bandwidth gap between each ITU channel to reduce wavelength "crosstalk". It must be noted that WDMs may operate as a filter for the "pass" path, i.e. only photons of the frequency or wavelength of the "pass" channel will propagate thru the pass path and all other frequencies and wavelengths will be reflected away from the "pass" path.

While it is not generally appreciated in this area, corrections can also be made to the coincidence measurements by first determining the background level of coincidence detections and compensating for this background by incorporating the single photon measurements as described in R. Meyers, et al., U.S. patent application Ser. Nos. 14/303,078, 14/461,625, and 16/829,272, herein incorporated by reference. Interpretations of measurements between at least two detectors such as in coincidence measurements can be improved by monitoring the single photon measurement counts and scaling by incorporating the single photon counts. For example, for photon number resolving detectors, the subtraction of the product of a relevant time average of the single photon counts from the relevant time average of the product of the single photon counts may improve the fidelity of the information received by the receiver that was sent by the sender. Also periods of high coincidence measurements with low single photon counts may indicate periods where there is low background noise and where signals can be received with higher fidelity.

As used herein the terminology correlated means that the correlation value is non-zero, i.e. positive or negative, and uncorrelated means that the correlation value is zero. The foregoing description is illustrative of particular embodiments of the invention, but is not meant to be a limitation upon the practice thereof. The following claims, including all equivalents thereof, are intended to define the scope of the invention.

As used herein a clock refers to a physical system that vibrates or oscillates repetitively as a precise frequency. A time tag may be considered herein as the number of times the clock has oscillated since the last reset to 0 of the time tag. For example if the clock oscillates at 1 Hz, then over a period of sixty seconds a list of time-tags would be generated from 0 to 59. The time tags typically used in this invention are associated with the repetition rate of the pulsed entangled photon source and the time tags would then range from 0 to N where N would be the last repetition count for the duration of the measurements. Furthermore a clock may be refer to a measurer of time, whether absolute or relative.

As used herein computer/processor refers to a component capable of performing specified tasks and algorithms. These components may include devices such as a typical computer or application specific integrated circuits (ASICS). In particular, by processor we mean any device which can perform computations and process data including but not limited to analog computers, digital computers, general purpose computers, graphical processing units (GPUs), and ASICS.

What is claimed is:

1. A system for measuring an entangled photon wavefunction comprising:
   at least one pulsed entangled photon source configured to output entangled photon pairs; the entangled photon pairs comprising first photons and second photons; the first and second photons being inputted to a wavefunction measurement subsystem;
   the wavefunction measurement subsystem comprising:
   at least four phase modulators;
   at least four polarization sensitive detectors;
   a photon path splitter configured to direct the first photons to a three way splitter and direct the second photons to a first phase modulator, the first phase modulator directs the second photons to a first polarization sensitive detector;
   the three way splitter being configured to direct the first photons to second, third, and fourth phase modulators respectively with a specified phase setting; the second, third and fourth phase modulators then direct the first photons to second, third, and fourth polarization sensitive detectors; and
   at least one processor configured to record both individual photon detection events and coincident detections events between the first polarization sensitive detector and the second polarization sensitive detector, the first polarization sensitive detector and the third polarization sensitive detector, and the first polarization sensitive detector and the fourth polarization sensitive detector; the at least one processor computes a wavefunction including a probability amplitude and a phase; measurements of the coincidence detections events and the individual photon detections events being performed simultaneously for specified phases; the at least one processor being further configured to apply signals to set the phase for the first, second, third and fourth phase modulators.

2. The system of claim 1 wherein the at least four phase modulators are configured to make orthogonal bases measurements; the at least one processor being further configured to compute the wavefunction from the orthogonal bases measurements.

3. The system of claim 2 wherein the probability amplitude of the wavefunction is computed from $$p_0 = \frac{G_0}{G_0}, p_1 = \frac{G_2}{G_0}, \text{ and } p_2 = \frac{G_2}{G_0};$$

the $G_0$, $G_1$, and $G_2$ being either measured coincidence counts or $G^{(2)}$ values at the specified measurement settings; wherein $G^{(2)}$ is a Glauber second order coherence value the probability amplitude of the wavefunction is computed using $$\psi = 2 - 2\sqrt{\left(1 - p_1 - p_2 - \left(\frac{p_1 - p_2}{2}\right)^2\right)} + i(p_1 - p_2);$$

the phase $\phi$ is computed as $$\phi = \tan^{-1}\frac{IMAG(\psi)}{REAL(\psi)}$$

wherein IMAG is a function that returns the imaginary component of a complex argument and REAL is a function that returns the real component of a complex argument.

4. The system of claim 1 wherein the at least four phase modulators are configured to make symmetric bases measurements; the at least one processor being further configured to compute the wavefunction from the symmetric bases measurements.

5. The system of claim 4 wherein the probability amplitude of the wavefunction $\psi$ is computed from $\psi = [(\bar{y} - y_0) + i(y_1 - y_2)/\sqrt{3}]/(2\gamma)$ wherein $y_0$, $y_1$, $y_2$ being either measured coincidence counts or second order Glauber coherence, $G^{(2)}$, values at the specified measurement settings;

$$\bar{y} = \frac{[y_0 + y_1 + y_2]}{3};$$

the value of $\gamma$ is determined by $$\gamma = \frac{\sqrt{\bar{y} + \sqrt{3\bar{y}^2 - 2\overline{y^2}}}}{\sqrt{2}};$$

the phase $\phi$ is computed as $$\phi = \tan^{-1}\frac{IMAG(\psi)}{REAL(\psi)}$$

wherein IMAG is a function that returns the imaginary component of a complex argument and REAL is a function that returns the real component of a complex argument.

6. The system of claim 1 wherein time is synchronized between the at least one pulsed entangled photon source and the wavefunction measurement subsystem by using residual pulsed pump photons to provide a clock for synchronization.

7. The system of claim 1 wherein the entangled photon pairs propagate through a first telescope, across an optional free-space path and are collected by a second telescope prior to the wavefunction measurement subsystem; a lens after the second telescope directs the entangled photons to a plurality of wavefunction measurement subsystems arranged in a two dimensional array; each of the plurality of wavefunction measurement subsystems being configured to collect single photon detection event counts and coincidence counts consistent with the selected wavefunction measurement technique; the processor being configured to compute and present the results of the wavefunction probabilities, phases, and derived quantities for each subsystem in the array as a function of temporal and spatial position of each of the component measurement subsystems.

8. The system of claim 7 wherein the two dimensional array is a camera.

9. The system of claim 7 further comprising the second telescope having adaptive optics elements.

10. The system of claim 9 wherein spatial information of the measured wavefunction subsystem is applied to the adaptive optics elements to improve quality of the measured wavefunction subsystem.

11. The system of claim 1 wherein the pulsed entangled photon source is provided by a pulsed laser and a spontaneous parametric down conversion (SPCD) process.

12. The system of claim 1 wherein the pulsed entangled photon source is provided by a pulsed laser and a four wave mixing (FWM) process.

13. A system for measuring an entangled photon wavefunction comprising:
at least one pulsed entangled photon source configured to output entangled photon pairs; the entangled photon pairs comprising first photons and second photons; the first and second photons being inputted to a wavefunction measurement subsystem;
the wavefunction measurement subsystem comprising:
at least two phase modulators;
at least two polarization sensitive detectors;
a photon path splitter configured to direct the first photons to a first phase modulator and the second photons to a second phase modulator, the first phase modulator directs the first photons to a first polarization sensitive detector; the second phase modulator directs the second photons to a second polarization sensitive detector; and
at least one processor configured to record both individual photon detection events and coincident detections events between the first polarization sensitive detector and the second polarization sensitive detector; the at least one processor being configured to apply signals to set phase modulator settings for the first phase modulator and the second phase modulator; measurements of the coincidence detections events and the individual photon detections events being performed sequentially for specified phases; the at least one processor determines a wavefunction including a probability amplitude and a phase; the wavefunction being determined by one of two means: the first means wherein the probability amplitude of the wavefunction is computed from $$p_0 = \frac{G_0}{G_0}, p_1 = \frac{G_1}{G_0}, \text{ and } p_2 = \frac{G_2}{G_0};$$

the $G_0$, $G_1$, and $G_2$ being either measured coincidence counts or second order Glauber coherence, $G^{(2)}$, values at specified orthogonal bases measurement settings; the probability amplitude of the wavefunction is computed using $$\psi = 2 - 2\sqrt{\left(1 - p_1 - p_2 - \left(\frac{p_1 - p_2}{2}\right)^2\right)} + i(p_1 - p_2);$$

the phase $\phi$ is computed as $$\phi = \tan^{-1}\frac{\text{IMAG}(\psi)}{\text{REAL}(\psi)}$$

wherein IMAG is a function that returns the imaginary component of a complex argument and REAL is a function that returns the real component of a complex argument; the second means wherein the probability amplitude of the wavefunction $\psi$ is computed from $\psi=[(\bar{y}-y_0)+i(y_1-y_2)/\sqrt{3}]/(2\gamma)$ wherein $y_0$, $y_1$, $y_2$ being either measured coincidence counts or second order Glauber coherence, $G^{(2)}$, values at the specified measurement symmetric bases settings;

$$\bar{y} = \frac{[y_0 + y_1 + y_3]}{3};$$

the value of $\gamma$ is determined by $$\gamma = \frac{\sqrt{\bar{y} + \sqrt{3\bar{y}^2 - 2\overline{y^2}}}}{\sqrt{2}};$$

the phase $\phi$ is computed as $$\phi = \tan^{-1}\frac{\text{IMAG}(\psi)}{\text{REAL}(\psi)}$$

wherein IMAG is a function that returns the imaginary component of a complex argument and REAL is a function that returns the real component of a complex argument.

14. The system of claim 13 wherein the first phase modulator and the second phase modulator are configured to make orthogonal bases measurements; the at least one processor being further configured to compute the wavefunction from the orthogonal bases measurements.

15. The system of claim 13 wherein the first phase modulator and the second phase modulator are configured to make symmetric bases measurements; the at least one processor being further configured to compute the wavefunction from the symmetric bases measurements.

16. The system of claim 13 wherein time is synchronized between the pulsed entangled photon source and the wavefunction measurement subsystem by using residual pulsed pump photons to provide a clock for synchronization.

17. The system of claim 13 wherein the pulsed entangled photon source is provided by a pulsed laser and a spontaneous parametric down conversion (SPCD) process.

18. The system of claim 13 wherein the pulsed entangled photon source is provided by a pulsed laser and a four wave mixing (FWM) process.

19. A method for measuring an entangled photon wavefunction comprising:

provnding a first and second wavefunction measurement subsystems, the first wavefunction measurement subsystem for determining a wavefunction phase and amplitude computed from $$p_0 = \frac{G_0}{G_0}, p_1 = \frac{G_1}{G_0}, \text{ and } p_2 = \frac{G_2}{G_0};$$

the $G_0$, $G_1$, and $G_2$ being either measured coincidence counts or second order Glauber coherence, $G^{(2)}$, values at the specified orthogonal measurement settings; the probability amplitude of the wavefunction is computed using $$\psi = 2 - 2\sqrt{\left(1 - p_1 - p_2 - \left(\frac{p_1 - p_2}{2}\right)^2\right)} + i(p_1 - p_2);$$

the phase $\phi$ is computed as $$\phi = \tan^{-1}\frac{\text{IMAG}(\psi)}{\text{REAL}(\psi)}$$

wherein IMAG is a function that returns an imaginary component of a complex argument and REAL is a function that returns a real component of a complex argument;

the second wavefunction measurement subsystem for determining the wavefunction phase and amplitude computed from $\psi=[(\bar{y}-y_0)+i(y_1-y_2)/\sqrt{3}]/(2\gamma)$ wherein $y_0$, $y_1$, $y_2$ being either measured coincidence counts or second order Glauber coherence, $G^{(2)}$, values at the specified symmetric measurement settings;

$$\bar{y} = \frac{[y_0 + y_1 + y_2]}{3};$$

the value of $\gamma$ is determined by $$\gamma = \frac{\sqrt{\bar{y} + \sqrt{3\bar{y}^2 - 2\bar{y}^2}}}{\sqrt{2}};$$

the phase $\phi$ is computed as $$\phi = \tan^{-1}\frac{\text{IMAG}(\psi)}{\text{REAL}(\psi)}$$

wherein IMAG is a function that returns an imaginary component of a complex argument and REAL is a function that returns a real component of a complex argument;

providing at least one pulsed entangled photon source configured to output entangled photon pairs; the entangled photon pairs comprising first photons and second photons; the first and second photons being inputted to a specified wavefunction measurement subsystem;

providing a first measurement unit comprising an input operating to receive the entangled photon pairs; the first wavefunction measurement subsystem operating to measure a wavefunction of the entangled photon pairs, at least four modulators and at least four photodetectors; wherein measurements of entangled photon single counts and coincidence counts of the entangled photon pairs for a wavefunction are performed simultaneously for specified phase values to thereby determine a wavefunction including a probability amplitude and a phase;

providing a second measurement unit comprising an input operating to receive the entangled photon pairs; the second wavefunction measurement subsystem operating to measure a wavefunction of the entangled photon pairs, at least two modulators and at least two photodetectors; wherein measurements of the entangled photon single counts and coincidence counts of the entangled photon pairs for the wavefunction are performed sequentially for specified phase values to thereby determine a wavefunction including a probability amplitude and a phase.

20. The method of claim 19 wherein the pulsed entangled photon source provides a plurality of distinguishable channels of entangled photon pairs and wherein each channel of entangled photons pairs provides for measurement of the entangled photon wavefunction and phase.

21. The method of claim 19 wherein the entangled photon pairs are generated by a spontaneous parametric down conversion process.

22. The method of claim 19 wherein the entangled photon pairs are generated by a four wave mixing process.

23. The method of claim 19 wherein measurements for the wavefunction are performed sequentially for specified phase values.

\* \* \* \* \*